(12) United States Patent
Mizue

(10) Patent No.: US 7,287,916 B2
(45) Date of Patent: Oct. 30, 2007

(54) OPTICAL PLUGGABLE TRANSCEIVER

(75) Inventor: Toshio Mizue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 185 days.

(21) Appl. No.: 11/258,374

(22) Filed: Oct. 26, 2005

(65) Prior Publication Data

US 2007/0167077 A1 Jul. 19, 2007

Related U.S. Application Data

(60) Provisional application No. 60/622,802, filed on Oct. 29, 2004, provisional application No. 60/622,690, filed on Oct. 28, 2004.

(51) Int. Cl.
*G02B 6/36* (2006.01)
(52) U.S. Cl. .......................... 385/92; 385/88
(58) Field of Classification Search ............ 385/88–94; 439/157, 372, 638
See application file for complete search history.

(56) References Cited

U.S. PATENT DOCUMENTS

| | | | |
|---|---|---|---|
| 6,430,053 B1 | 8/2002 | Peterson et al. | 361/728 |
| 6,439,918 B1 | 8/2002 | Togami et al. | 439/372 |
| 6,744,963 B2 | 6/2004 | Hwang | 385/139 |
| 6,916,123 B2 * | 7/2005 | Kruger et al. | 385/92 |
| 7,004,647 B2 * | 2/2006 | Malagrino et al. | 385/92 |

OTHER PUBLICATIONS

"Small Form-factor Pluggable (SFP) Transceiver MultiSource Agreement (MSA)"; Agilent Technologies, et al.; Sep. 14, 2000; pp. 1-38.
U.S. patent application by Toshio Mizue, et al., also filed on Oct. 26, 2005, entitled Optical Pluggable Transceiver.

* cited by examiner

*Primary Examiner*—Quyen P Leung
(74) *Attorney, Agent, or Firm*—Smith, Gambrell & Russell, LLP

(57) ABSTRACT

The optical pluggable transceiver according to the present invention has features of a good heat dissipating function with a simplified configuration thereby reducing the cost of not only the component used but also the process itself. The transceiver of the present invention comprises a resin frame, an optical subassembly, a electronic substrate, both mounted on the frame, a heat dissipating member, made of metal, for conducting and radiating heat generated by the electronic circuit on the substrate, and a metal cover for putting these frame, subassembly, substrate, and heat dissipating member therein. A greater part of the surface of the heat dissipating member exposes from the cover, accordingly, the efficiency for radiating heat may be improved. Moreover, these members of the frame, the optical subassembly, the substrate, the heat dissipating member, and the cover are assembled only by fitting without screwing or gluing. Accordingly, the manufacturing process of the transceiver can be extremely simplified.

17 Claims, 12 Drawing Sheets

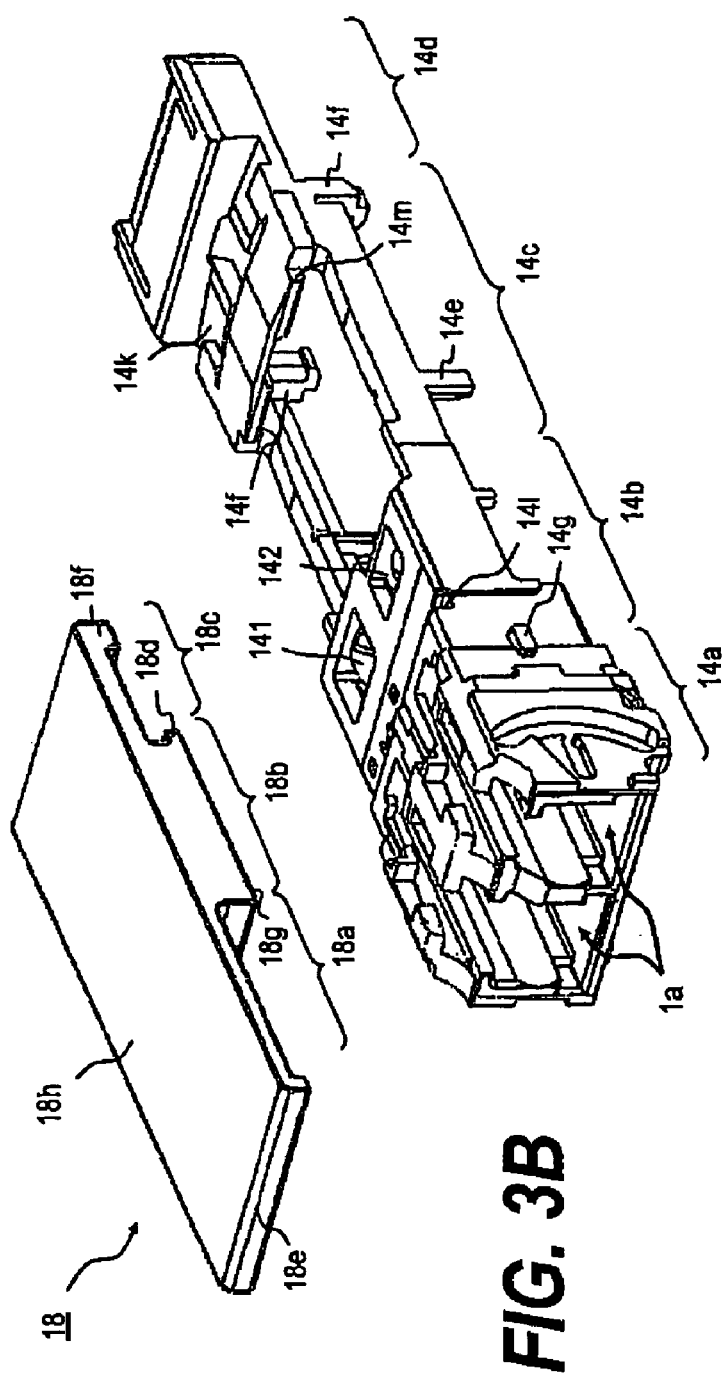
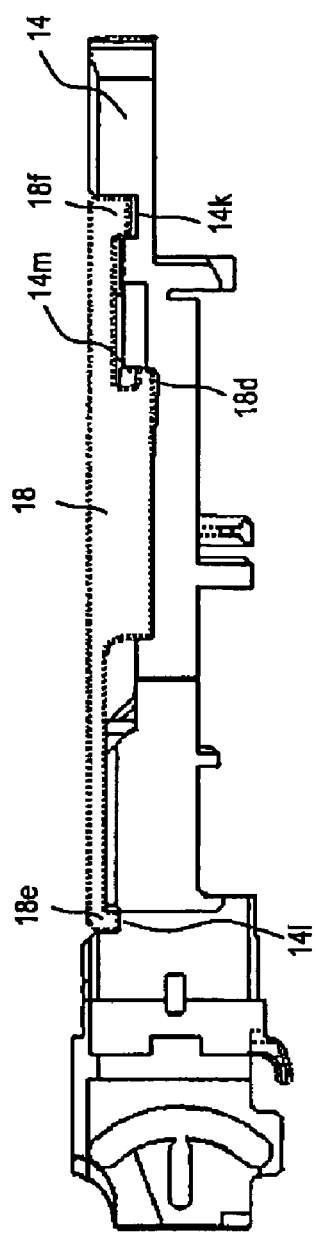
FIG. 3A
FIG. 3B
FIG. 3C

OPTICAL PLUGGABLE TRANSCEIVER

CROSS REFERENCE TO RELATED APPLICATIONS

The present application claims the benefit of the provisional application Ser. No. 60/622,690, filed Oct. 28, 2004; and the provisional application Ser. No. 60/622,802, filed Oct. 29, 2004.

BACKGROUND OF THE INVENTION

1. Field of the Invention

The present invention relates to a new releasing mechanism of the pluggable transceiver from the cage.

2. Related Prior Art

The pluggable optical transceiver (hereinafter denoted as transceiver) is installed on the host system such that a cage, which is made of metal and has a box shape with one end being opened and protruded from the face panel of the host system, receives the transceiver in the open end thereof to expose the optical receptacle provided in the front end of the transceiver from the face panel of the host system. The optical receptacle receives an optical connector accompanied with an optical fiber. Thus, the optical fiber may optically couple with an optical device installed within the transceiver and establish the optical communication between the fiber and the optical device.

The cage provides an electrical connector in the deep end thereof, while the transceiver provides, in a rear end thereof, an electrical plug to mate with the electrical connector in the cage. By inserting the transceiver into the cage, the electrical plug of the transceiver comes to mate with the electrical connector, which enables the transceiver to communicate with the host system, namely, exchanging the electrical information and supplying the electrical power from the host system to the transceiver. Moreover, by setting the electrode of the plug in a preset configuration, the transceiver can be optionally inserted into or removed from the cage as the host system is powered on, which is the so-called hot-pluggable function.

One type of such pluggable transceiver has been specified in a multi-source agreement (MSA) as "Small Form-Factor Pluggable (SFP) Transceiver Multi Source Agreement" published through the internet <http://www.shelto.com/SFP/SFP MSA.pdf>. However, this MSA merely specifies the fundamental electrical specification, the pin-assigning, and the physical dimensions, rules no substantial architecture. The MSA only ensures that, as long as the transceiver satisfies the agreement, the transceiver can be installed within the cage and show the fundamental performance. Recently, the optical communication may be available in personal, namely, the optical fiber is brought to the independent home, and an optical transceiver that satisfies the agreement with the cost thereof further reduced has been requested.

The U.S. Pat. No. 6,744,963, has disclosed one type of engaging mechanism with a bail and an actuator of the pluggable transceiver. Rotating the bail, which has a U-shaped configuration to put the optical receptacle between two legs thereof, around the center formed in a middle of the legs, the actuator may slide backward working together with the bail's rotation. The actuator has a tapered surface in the rear end thereof. The tapered surface slips under the latch tab of the cage by the sliding of the actuator to push up the latch tab, accordingly, the transceiver may be released from the cage.

Another U.S. Pat. No. 6,439,918, has disclosed another configuration of the releasing mechanism that also comprises of the bail and the actuator. The actuator in this prior art is attached, in the center portion thereof, to the body of the transceiver. The actuator may move in a seesaw motion by the attached portion as the center of the motion. Rotating the bail, the bail pushes out the forward arm of the actuator, which pulls in the rear arm of the actuator by the seesaw motion thereof. Since the rear arm forms a projection in the tip thereof to be engaged with the cage, the transceiver may be released from the cage.

Still another U.S. Pat. No. 6,430,053, has disclosed a releasing mechanism comprised of a bail and a base. The bail has a shaft working together with the rotation of the bail. In the end of this shaft is provided with a projection having a tapered surface. The shaft slides backward as rotating the bail to slip under the latching tab of the cage to push up the tab. Accordingly, the engagement between the transceiver and the cage may be released. The releasing mechanism of this prior art is so similar to those described in the U.S. Pat. No. 6,744,963.

Recently, an optical hub system has been proposed and developed in part, in which a plurality of cages is densely arranged in vertical and horizontal. In such system, the gap to the nearest cage becomes only a few millimeters. When the pluggable transceiver is inserter into or removed from such densely arranged cages, the grip of the bail cab no be occasionally handled. In one example, when cages neighbor to the target transceiver receive other pluggable transceivers with an optical connecter and an optical cable accompanied with the optical connector, these optical cables and connectors disturb to handle the grip of the target transceiver.

To release the target transceiver is necessary to release neighbor transceivers, or to use some special tools to bring out the target transceiver from the cage, which makes it troublesome and occasionally breaks the transceiver, or the optical connector. Moreover, for the transceiver with the bail to release from the cage by rotating in the front of the receptacle, the neighbor transceivers, or the neighbor connectors with the cable disturbs even to touch the bail.

SUMMARY OF THE INVENTION

The optical pluggable transceiver according to the present invention has a feature that the transceiver provides an optical receptacle, a bail and an actuator. The bail is assembled with the optical receptacle to surround the receptacle and to be able to rotate so as to traverse the receptacle. The bail of the present invention extends in the front of the receptacle greater than that in the top or the bottom. The actuator includes a rotational axis and two arms putting the axis therebetween. Each arm may move in a seesaw motion by the rotational axis as a center of the motion, namely, one arm moves in up-and-down cooperating with the rotation of the bail, while the other arm with a projection to be engaged with the cage may move in down-and-up, accordingly, the engagement between the transceiver and the cage can be released.

Since the bail of the transceiver is thus configured, the target transceiver can be handled even when, in the cages being densely arranged hub system, the cages neighbor to the target one receive the optical transceiver with the optical connector and the optical cable, the target transceiver can be accessed in the grip or the bail thereof to bring out from the cage in ease. Merely increasing the room for the bail to protrude from the receptacle, it may be enough to lengthen the leg of the bail. In such configuration, the protrusion from the top, or from the bottom, of the receptacle also increases, which deviates the transceiver from the agreement. On the other hand, to move the rotational center of the bail close to the edge of the receptacle also widens the room of the bail at the front of the receptacle. However, this configuration deviates from the standard of the optical connector because the bail exists in the space where the optical connector should be received. The mechanism according to the present invention can dynamically expand the room where the bail extends at the front of the receptacle as satisfying the agreement according to the pluggable transceiver and the standard according to the optical connector Specifically, the bail comprises a pair of legs and a grip portion connecting the legs. The leg forms a first guide projection in a portion between the tip of the leg and the grip portion, while the second guide projection in the tip thereof. The optical receptacle forms a first guide groove for receiving the first guide projection and a second guide groove for receiving the second guide projection. The first guide groove configures in a line with a starting point and an ending point, while the second guide groove configures an arc whose center locates in a virtual point extending the first guide groove.

Since two guide grooves are thus configured, the bail can stand in vertical at both the top and the bottom of the transceiver, and increase the room at the front of the receptacle. The second guide groove is not restricted to the arched shape, and may be in linear by accepting the standstill at the top or the bottom of the receptacle not vertical thereto. Moreover, even when the standstill at the top or the bottom may be maintained, the shape of the second guide groove is not restricted to the arch. It is the only condition to set the bail stable in the vertical position that the starting point of the first guide groove locates in a position vertical to the starting portion of the first guide groove.

Moreover, the bail of the present invention provides a cam with a major surface accompanied with a major axis thereof and a minor surface with a minor axis and the center of the cam coincides with that of the first guide projection. The actuator, in one arm thereof, forms a sliding surface to come in contact to the cam. When the first guide projection locates in the starting point in the first guide groove, the minor surface of the cam touches the sliding surface of the actuator, and the other arm of the actuator, the tip thereof having a latching projection, is pushed out this latching projection. On the other hand, when the first guide projection moves to the end point in the first guide groove, the major surface of the cam pushes out the sliding surface of the actuator and the latching projection may be pulled in the transceiver to release the engagement between the latching projection and the cage.

The transceiver of the present invention further provides a metal cover that includes a support fin to support the actuator from the downward. By a resilient force inherently attributed to the metal plate, the one arm with the sliding surface is pushed to the optical receptacle. Accordingly, the bail becomes stable in the position where the first guide projection locates in the stating portion in the first guide groove, that is, the minor surface comes in contact to the sliding surface. In this position, the latching projection is pushed out from the transceiver to engage with the cage.

BRIEF DESCRIPTION OF DRAWINGS

FIG. 3A is a perspective view of the heat dissipating member, FIG. 3B is a perspective view of the frame, and FIG. 3C is a side view of the frame assembled with the heat dissipating member;

DESCRIPTION OF PREFERRED EMBODIMENTS

Figure 1A:
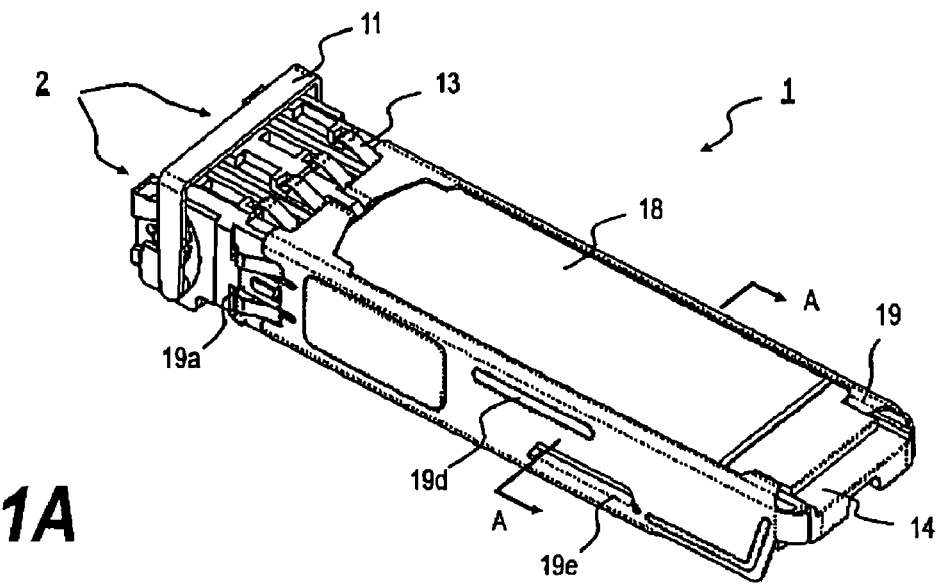
FIG. 1A is a perspective diagram viewed from the top of the transceiver.

Next, preferred embodiments of the optical transceiver according to the present invention will be described as referring to accompanying drawings. In the drawings and the explanations, the same symbols and the same numerals will refer the same elements without overlapping explanations. The present invention provides an optical transceiver, which solves the subjects not only to maintain the heat dissipating performance and ensure the widest area for mounting the components but also to reduce the number of the components as reducing the cost themselves, in addition to simplify the assembly of the components, accordingly, to decrease the production const thereof.

FIG. 1A is a perspective diagram of the transceiver 1 viewed from the top thereof, while FIG. 2A is a diagram viewed from the bottom. The optical transceiver 1 has a rectangular parallelepiped shape, the forward end of which forms an optical receptacle 1a, while the rear end forms an electrical plug 17a, which mates with the electrical connector mounted on the host system, provided on a substrate 17. Here, the front and the rear corresponds to a side where the optical receptacle 1a is formed and to a side opposite thereto, respectively, for the description sake. The transceiver provides, in addition to the optical receptacle 1a, the bail 11 and the actuator 12 in the front. The frame 14 installs the substrate 17 in the rear, while the forward thereof forms the optical receptacle 1a in a body as holding the actuator 12 and the bail 11. The projection 12a of the actuator 12 and a plurality of fingers of the finger member 13 exposes and protrude from the front end of the cover 19. The projection 12a comes to mate with the opening in the cage to fix the transceiver 1 to the cage. The bail 11 and the actuator 12 provide the function to release this mating between the transceiver 1 and the cage. The fingers 13a stabilize the ground potential of the transceiver 1 and provide paths for dissipating heat to the outside thereof by coming in contact to the inside of the cage when the transceiver is inserted into the cage.

Figure 2:
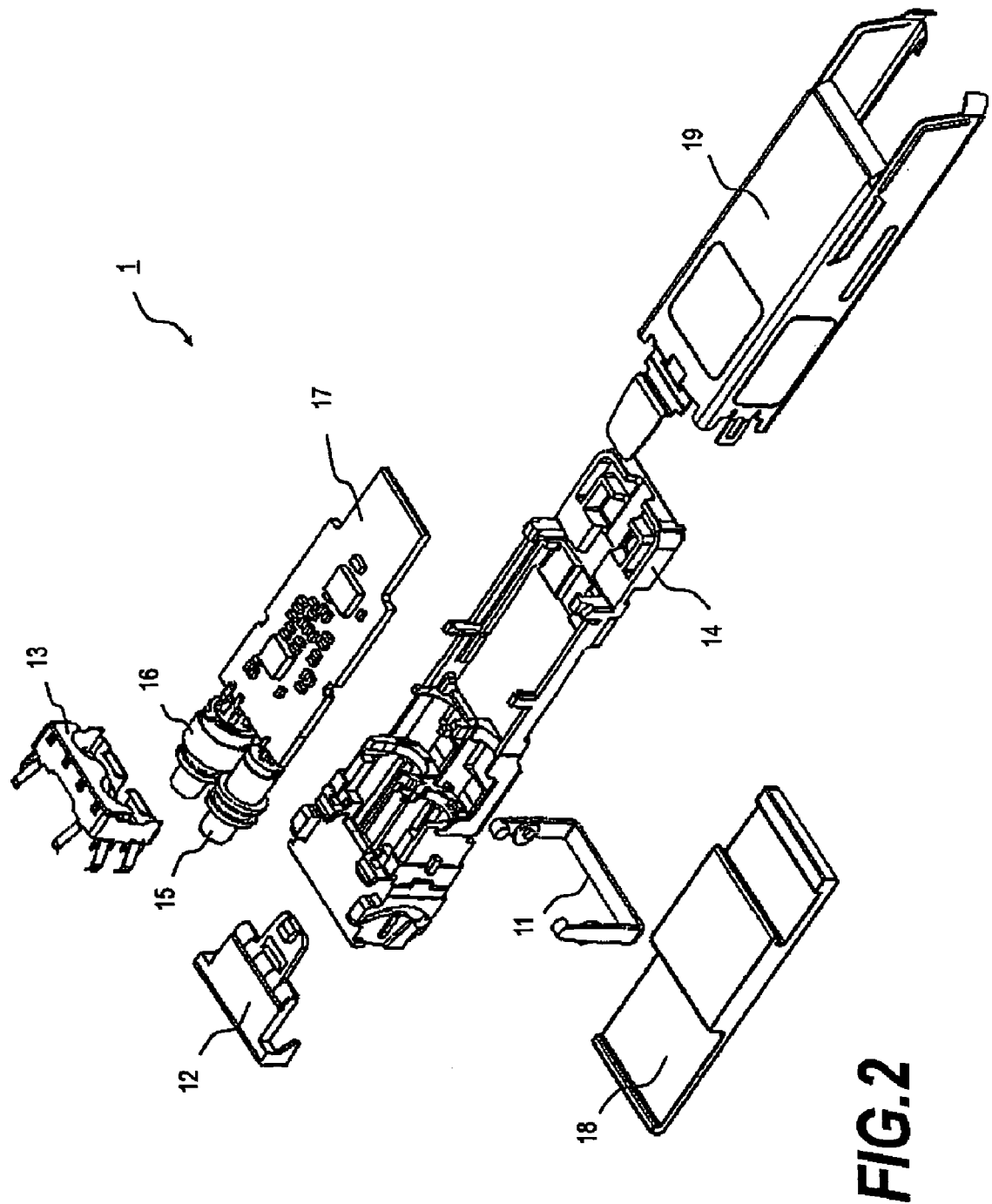
FIG. 2 is an exploded view of the transceiver according to the present invention.

FIG. 2 is an exploded diagram of the transceiver 1 viewed from the bottom thereof. Here, the bottom corresponds to a side where the bail 11 and the actuator 12 are attached thereto, while the top corresponds to an opposite side. The frame 14, made of resin, is integrated in a body with the optical receptacle 1a. The frame is plated in entire surface thereof with metal to ensure the shielding of the transceiver 1. The frame 14 assembled with the heat dissipating member 18, which has a configuration to fit to the frame 14, the bail 11 and the actuator 12 in the front side. As explained later in this specification, the substrate 17 is assembled with the frame 14 by positioning at six points after electrically connected with a transmitting optical subassembly (TOSA) 15 and a receiving optical subassembly (ROSA) by using a positioning tool. The finger member 13 is fixed to the frame by winding around the frame 14 at a position where the TOSA 15 and the ROSA 16 are installed and sliding the cover 19 to wrap the edge of the finger member 13. The cover 19 is slid from the rear to put the heat dissipating member 18, the frame 14 and the substrate 17 therein.

Next, details of the heat dissipating member 18 and the process for assembling the transceiver 1 of the present invention will be described.

Assembly of the Frame with the Heat Dissipating Member

FIG. 3A is a perspective view of the heat dissipating member 18, FIG. 3B is a perspective view of the frame 14, and FIG. 3C is a side view of the frame 14 assembled with the heat dissipating member 18.

The heat dissipating member 18, having a substantially rectangular plan view, includes first to third portions, 18a to 18c, from the front side of the transceiver 1. The second portion 18b is thicker than the other two portions, 18a and 18c. The tip of the first portion 18a forms a rib 18e, while the tip of the third portion 18c forms another rib 18f. The width of the former rib 18e is narrower than the latter rib 18f. Moreover, the rear end of the second portion 18b, i.e. at the boundary between the second and third portions, 18b and 18c, form a hooked projection 18d. As shown later, the thicknesses of these first to third portions, 18a to 18c, trace the cross-sectional shape along the longitudinal direction of the frame 14.

The heat dissipating member 18 is formed by the metal extrusion method. Metal used for the heat dissipating member 18 is preferable to have a thermal conductivity greater than 60 Wm/K, and the present transceiver applies aluminum. The cross section of the heat dissipating member 18 along the longitudinal axis of the transceiver 1 traces that of the frame 14. Die-casting or processing of sheet metals is typically applied to form components with complex structures. However, the die-casting has a disadvantage from the cost viewpoint, while the latter, the processing of the sheet metal, has inferior to ensure the flatness. The heat dissipating member 18 of the present invention is formed by the metal extrusion method, which makes the cost merit and the stiffness of the component inconsistent.

As shown in FIGS. 3A and 3C, the hooked projection along the longitudinal axis of the transceiver 1 mates with the overhang in the cross section thereof, which realizes the fitting configuration. However, the heat dissipating member 18 is not fixed along the transverse direction. By setting the cover 19 to put the frame 14 and the heat dissipating member 18 therein, and by fixing the cover 19 to the member 18, the heat dissipating member 18 is fixed to the frame 14. The cover 19 exposes the top of the transceiver 1, namely, the top of the transceiver 1 exposes the surface 18h of this heat dissipating member 18.

The frame 14, formed by the injection molding, includes first to fourth portions, 14a to 14d, from the front side to the rear side. The first portion 14a forms two optical receptacles 1a, each corresponding to the optical transmission and the optical reception, respectively. The inner dimension of the receptacle 1a is strictly decided by the standard of the optical connector to mate with this receptacle 1a. The second portion 14b mounts the TOSA and the ROSA, 15 and 16. On the top of this second portion 14b is formed with two openings, 141 and 142, to bury thermal sheets to couple the OSAs, 15 and 16, in thermal with the first portion 18a of the heat dissipating member 18. The thermal sheets, which are not shown in figures, may thermally couple the OSAs, 15 and 16, with the member 18 by ensuring the heat dissipation path from the stem, 15c and 16c, which mount the semiconductor devices thereon, to the heat dissipating member 18. Between the first and second portions, 14a and 14b, forms a projection 14g in the side thereof to latch the cover 19. By engaging this projection 14g with the opening provided within the latch tab 19a, the cover 19 is latched with the frame 14.

The third portion 14c mounts the substrate 17 thereon. That is, the third portion 14c provides the first type of post, 14e and 14f, for engaging with the substrate 17 and the other type of post 14h for abutting against the substrate 17. As shown in the later, to fit notches and steps formed in respective sides of the substrate 17 to these posts, 14e, 14f and 14h, fixes the substrate 17 to the frame 14. The fixing is carried out only by the fitting those posts in the frame 14 to corresponding structures in the substrate 17, without any screws or adhesive.

The bottom surface 18g of the second portion 18b of the heat dissipating member 18 comes in contact to the component, such as ICs, mounted on the substrate 17 via a thermal sheet, which ensures the heat dissipating path from the IC to the member 18. Between the third and fourth portions, 14c and 14d, is formed with an overhang 14m to fix the heat dissipating member 18 to the frame 14. The hooked projection 18d engages with this overhang 14m, which assembles the heat dissipating member 18 with the frame 14. The position of the heat dissipating member 18 along the longitudinal direction is defined by two ribs, 18e and 18f, while the up-and-down direction thereof is defined by putting the frame 14 and the member 18 within the cover 19 after temporally engaging this hooked projection 18d with the overhang 14m.

The fourth portion 14d forms a groove 14k to engage with the rib 18f in the rear end of the heat dissipating member 18, while between the first and second portions, 14a and 14b, is formed with another groove 14l to receive the rib 18e in the front end of the member 18. The heat dissipating member 18 is assembled with the frame 14 by sliding thereof along the transverse direction of the transceiver 1 as two ribs, 18e and 18f, insert into corresponding grooves, 14l and 14k, and the hooked projection 18d mates with the overhang 14m. As shown in later, the top surface 18h of the heat dissipating member 18 exposes outside even after setting the cover 19. Accordingly, the radiative efficiency to the cage may be maintained. Moreover, some cages occasionally provide a movable fin for radiating the heat, the heat dissipating member 18 of the present transceiver may come in directly contact to such movable fin, which realizes the most effective heat dissipating function. In the explanation above, the assembly of the heat dissipating member 18 with the frame 14 is carried out in advance to that of the substrate with the frame 14. However, it may be applicable to assemble the heat dissipating member 18 with the frame 14 after the assembly of the substrate 17 with the frame 14.

Assembly of the Substrate with the Frame

Figure 4:
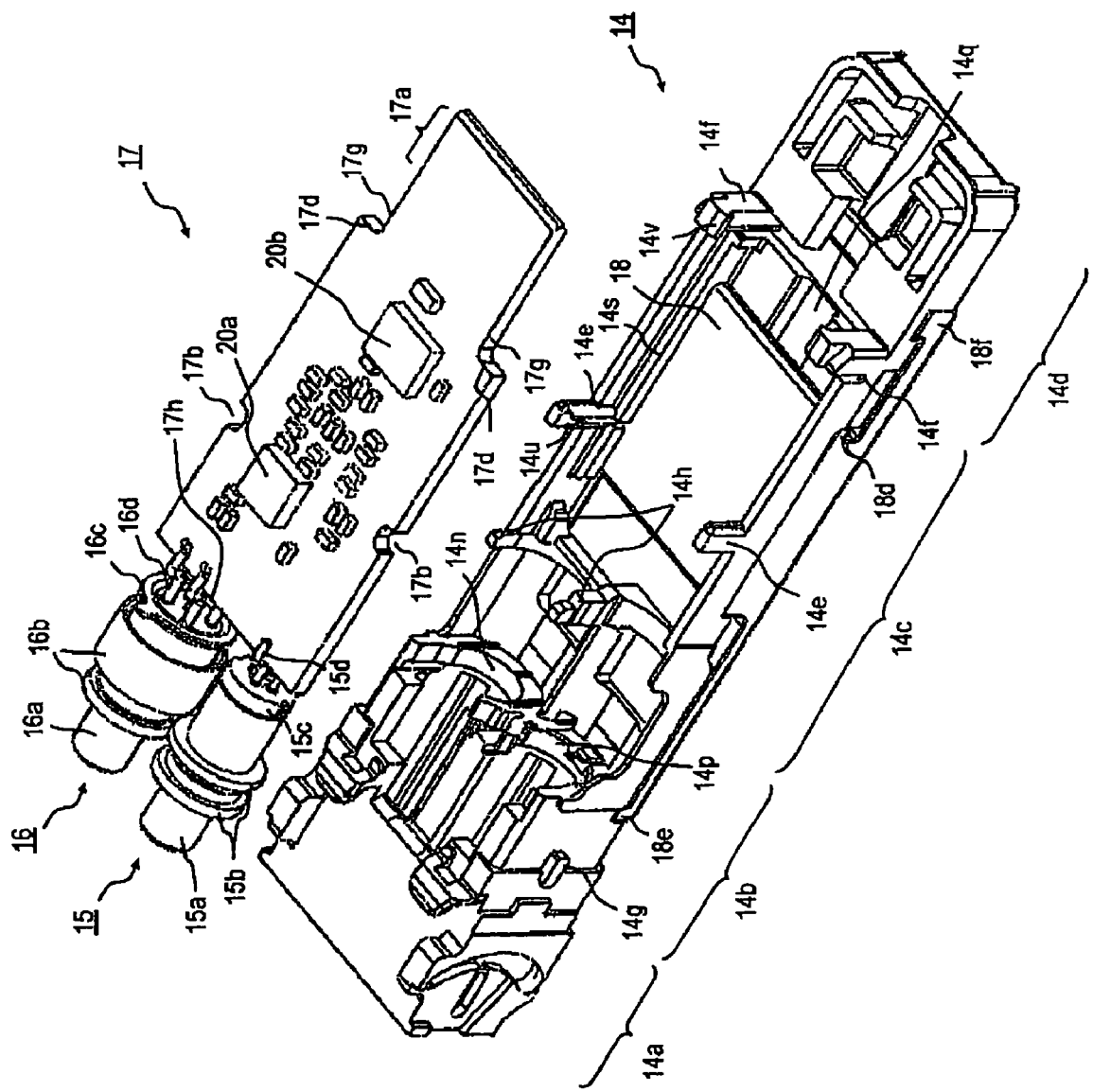
FIG. 4 shows a process for assembling the substrate, which is built with the sub-assemblies, with the frame.

The assembly of the frame 14 with the substrate 17 is performed by four fitting mechanisms and two positioning mechanisms. FIG. 4 shows the process of this assembly. In FIG. 4, the frame 14 provides the heat dissipating member 18 in advance to the assembly with the substrate 17.

First, the substrate 17 is connected to the OSAs, 15 and 16, before assembled with the frame 14. The OSAs, 15 and 16, each provides the sleeve, 15a and 16a, in the front side thereof, while the stems, 15c and 16c, in the rear side thereof. The stem, 15c and 15c, extrudes a plurality of lead pins, 15d and 16d, in rearward to connect to the corresponding electrode on the substrate 17 in electrical. On the stem, 15c and 16c, is installed with a laser diode (LD) for the TOSA 15, while, for the ROSA, the stem 16c installs a photodiode (PD) and a preamplifier for amplifying electrical signal generated by the PD. On the root of the sleeve, 15a and 16a, is formed with a pair of flanges, 15b and 16b, which positions the OSAs, 15 and 16, with respect to the frame 14 along the longitudinal direction by sandwiching the walls, 14n and 14p, formed in the second portion 14b.

The substrate 17 has a width substantially equal to that of the transceiver 1. Although not explicitly shown in FIG. 4, the rear end thereof forms a plurality of electrodes for the electrical plug 17a. On both sides of the substrate 17 are formed with notches 17b, and steps 17d. These four structures and the front end 17h determine and position the substrate 17 on the frame 14. The substrate 17 mounts a plurality of ICs, 20a and 20b, resistors, and capacitors. Although not shown in FIG. 4, the opposite surface of the substrate 17 also mounts the IC 20c and some electrical components. As shown in later, the heat dissipating member 18 may thermally couple with the IC 20c mounted on the opposite surface facing the member 18.

The frame 14 forms the first type of posts, 14e and 14f, in the side of the third portion 14c and in the side between the third and forth portions, 14c and 14d, respectively. Further, the frame 14 forms the second type of posts 14h in the center and the side at the boundary between the second and third portions, 14b and 14c. Since the outside dimension of the substrate 17 inherently accompanies with a tolerance of around 0.1 mm, these posts are required, in order to anchor the substrate as ensuring the enough engaging strength, to be tall enough to deform and to compensate such tolerance, when the substrate 17 is to be fit to the frame 14. However, the multi source agreement (MSA) concerning to this transceiver rules the height thereof, accordingly, the post is limited in the height thereof and does not provide an enough margin to fit the substrate 17. In the present transceiver 1, the first type of post 14e formed in the forward accompanies with a beam 14s beneath the post 14e and, by deforming this beam 14s in torsional, the post 14e deforms enough to compensate the tolerance and to ensure the engaging force with the substrate 17.

For instance, when the beam 14s has a cross section of 2.4 mm in the height by 0.8 mm in the width, and is made of resin with a modulus of the transverse elasticity and an allowable shearing stress being 48 MPa and 80 MPa, respectively, the post 14e can be deformed by 0.5 mm in the tip thereof for the length of the post 14e of 4.5 mm by configuring the beam length longer than 3 mm in both of the front and the rear of the post 14e. That is, the engaging length can be ensured greater than 0.5 mm.

For the post 14f in the rear side of the transceiver 1, the frame 14 forms, in a center thereof, a groove 14q with a thinner wall to deform the post 14f enough when the substrate 17 is fit into the frame 14. That is, by bending at this groove 14q, the distance between the posts 14f may be widened to fit the substrate 17, which reduces the resistant force for the insertion of the substrate 17 and enhance the productivity. By setting the rear of the substrate 17 as abutting the front edge 17h against the second type of posts 14h, the notch 17b engages with the post 14e and the side 17g of the step 17d is fit in the side of the other post 14f.

On the other hand, for the longitudinal direction of the substrate 17, by abutting the other surface of the post 14f against the step 17d, the substrate 17 may be put between the first type of post 14f and the second type of post 14h. The tip of respective posts, 14e and 14f, form hooks, 14u and 14v, accordingly, once set the substrate 17 to the posts, 14e and 14f, the substrate 17 is hard to disassemble with the frame 14.

Figure 5:
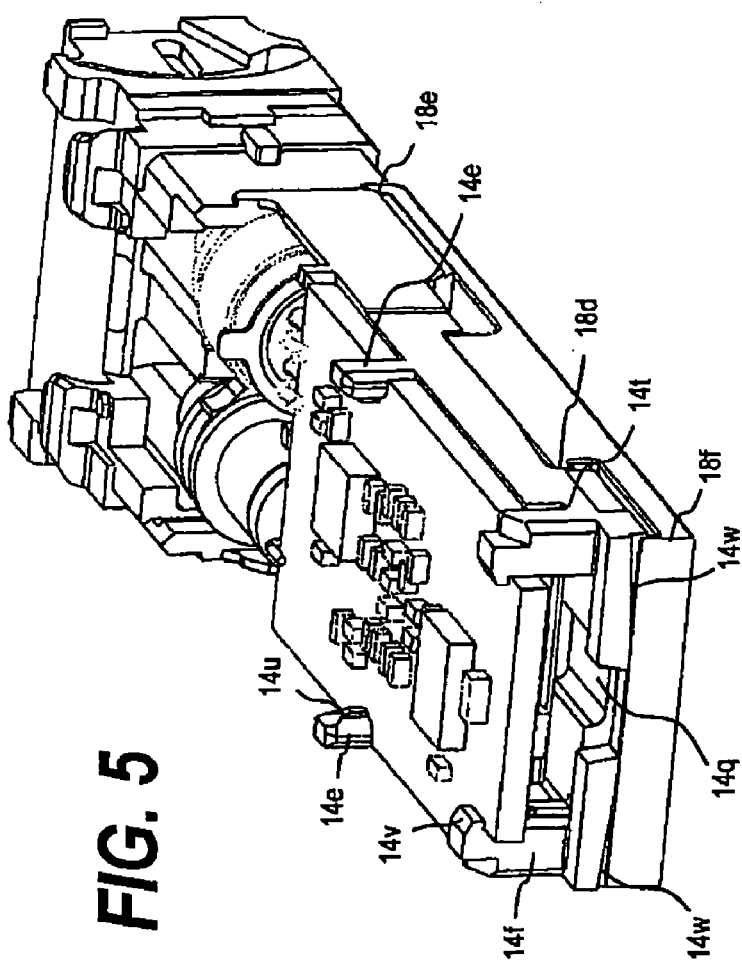
FIG. 5 is a perspective diagram, which is viewed from the rear, of the frame assembled with the sub-assemblies and the substrate.

FIG. 5 illustrates the frame 14 assembled with the substrate 17 viewed from the rear. The first type of posts, 14e and 14f thereto, sandwich the substrate 17 and influence the resilient force by the deformation of the frame 14. Further, both sides 14w of the rear groove 14q shapes in arc to provide a room to bend the frame 14 so as to expand the distance between posts 14f, which makes it easy to set the substrate 17 in the frame 14.

Figure 6:
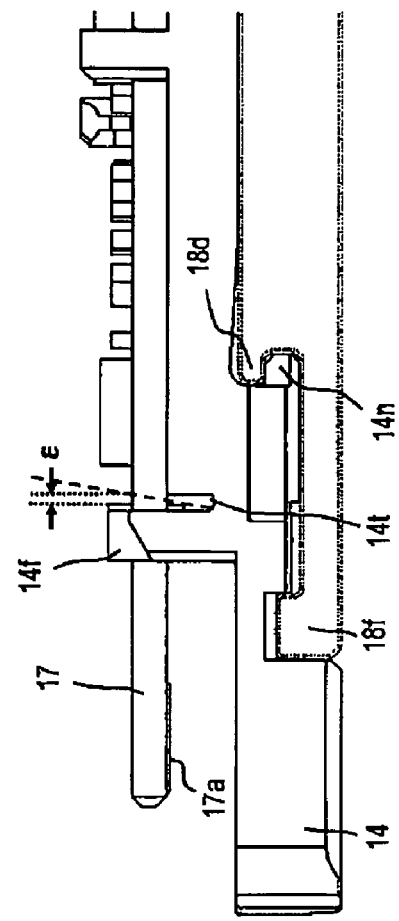
FIG. 6 schematically shows the mechanism that the rear fitting post presses the substrate forward.

FIG. 6 illustrates the mechanism to fix the substrate 17 to the frame 14 along the longitudinal direction. The substrate 17 is set to the frame 14 as pressing the post 14f rearward. Once setting to the frame 14, the post 14f presses the substrate 17 forward, which fixes the substrate 17 to the frame 14. Specifically, the post 14f leans forward by about 0.2 mm before receiving the substrate 17. After setting the substrate 17 as abutting the front edge 17h thereof against the second type of post 14h, the post 17f deforms to the shape shown in FIG. 6, i.e., substantially perpendicular to the primary surface of the frame 14. In this position, the post 14f presses the substrate 17 by;

$$F = 3EI\epsilon/L^3.$$

Where E and I are Young's modulus and the second moment of area of the resin material of the frame 14, respectively, $\epsilon$ is the displacement, and L is the height of the post. By setting the height L and the cross section of the post 14f not to exceed the permissible stress for the displacement $\epsilon$, the magnitude of the force to press the substrate 17 forward may be optionally determined. Moreover, the present optical transceiver 1 provides a groove 14t just front of the post 14f to adjust the height thereof.

The optical transceiver 1 thus configured may install the substrate 17 only by the frame 14 without any other components. Moreover, (1) to hold the substrate 17 in flexible along the longitudinal direction may relax the thermal stress due to the discrepancy in the linear expansion between the substrate 17 and the frame 14, (2) the substrate 17 once set on the frame 14 does not loose and has an improved positional accuracy because the substrate 17 is held by the frame 14 such that the post 14e puts the substrate 17 along the transverse direction while the other posts 14f sandwiches the substrate 17 along the transverse direction and, cooperated with the post 14h, along the longitudinal direction, and (3) the thermal sheet may be put between the heat dissipating member 18 and the IC 20c because the substrate 17 is assembled with the frame 14 only by fitting.

Assembly of the OSA with the Frame

Figure 7A:
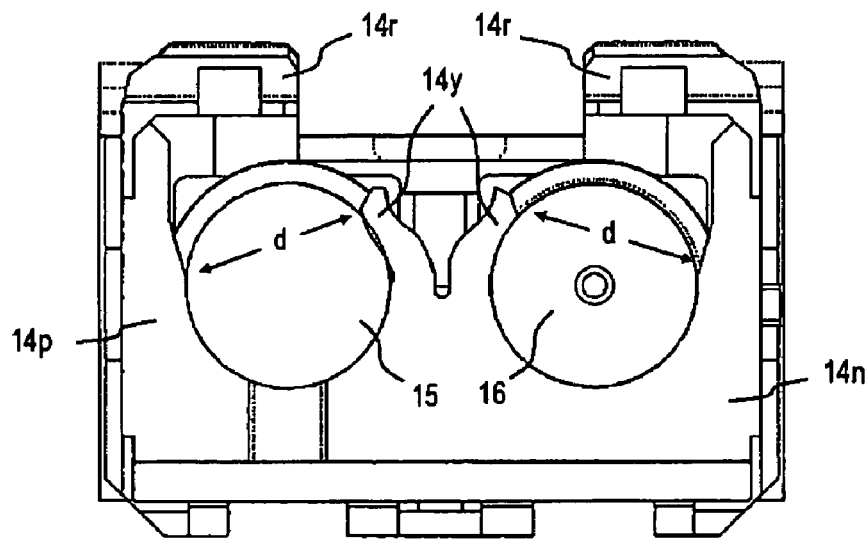
FIG. 7A is a cross section showing the sub-assemblies mounted on the frame.
Figure 7B:
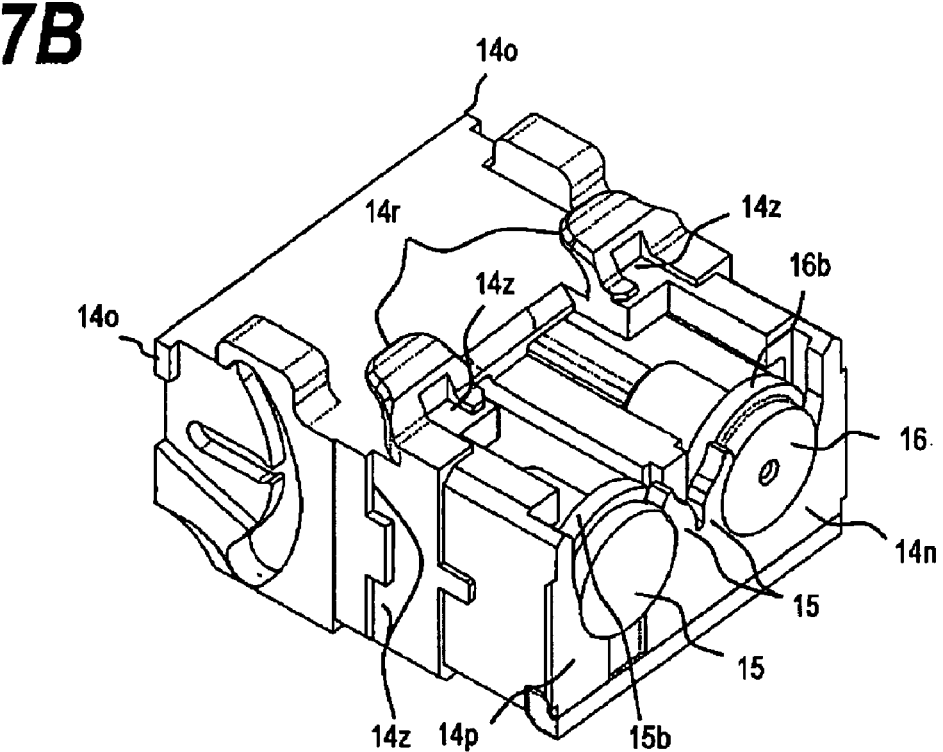
FIG. 7B is a perspective view of the frame and the sub-assemblies mounted on the frame.

The transceiver 1 of the present invention enhances the productivity by assembling the OSA with the frame 14, similar to the assembly of the substrate 17 with the frame 14, only by fitting without any member to fix the OSAs, 15 and 16, to the frame 14 such as a holder. FIGS. 7A and 7B illustrates the OSAs, 15 and 16, assembled with the frame 14, in a cross section thereof (FIG. 7A) and a perspective view (FIG. 7B). These figures, FIGS. 7A and 7B, correspond to those viewing forward from the partition walls, 14n and 14p, in FIG. 4. The wall, 14n and 14p, form a finger 14y. The OSAs, 15 and 16, having a cylindrical shape, are fit to the preset positions from the upper in the drawing, from the bottom side of the transceiver 1 in the practical configuration. The gap d between the finger 14y and wall facing thereto is slightly smaller than the diameter of the grip portion between two flanges, 15b and 16b. The OSAs, 15 and 16, may be set into the position because not only the grip portion thereof expands this gap d but also the distance between two OSAs, 15 and 16, may be widened within the flexibility of the lead pins, 15d and 16d. Moreover, the OSAs, 15 and 16, once set in the frame 14 are hard to disassemble as long as the gap d is manually expanded even the frame 14 with OSAs, 15 and 16, is held in upside-down, because the finger 14y recovers its original position due to the resilient characteristic of the resin member of the frame 14.

The longitudinal position of the OSA may be determined by sandwiching the partition wall, 14n and 14p, with the flanges, 15b and 16b. As shown in later, the finger member 13 is inserted between a gap between this wall, 14n and 14p, and the rear flange, 15b and 16b. Thus, the OSA is automatically positioned and fixed with respect to the frame 14 without any additional components.

Assembly of the Finger Member

Figure 8A:
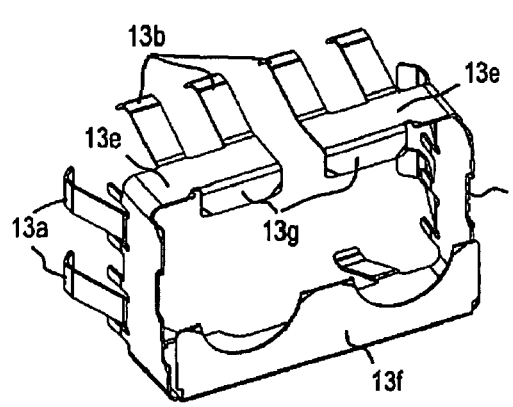
FIG. 8A and FIG. 8B are perspective diagrams of the finger member viewed from the rear top and the front bottom, respectively.
Figure 8B:
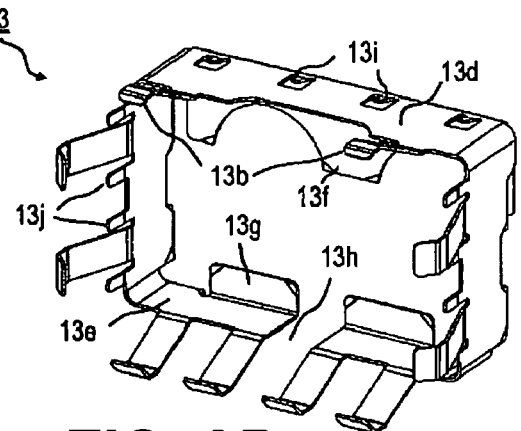
Figure 8C:
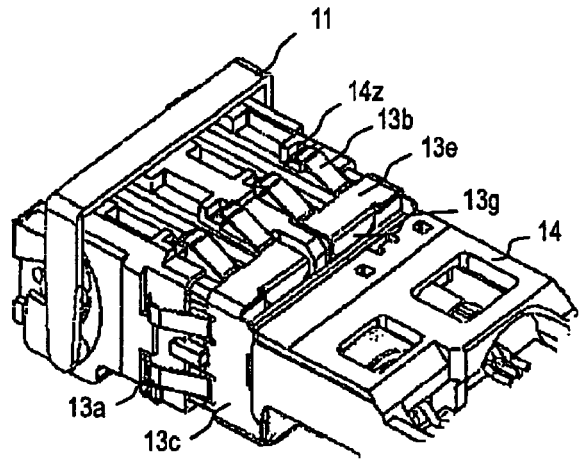
FIG. 8C and FIG. 8D are perspective diagrams of the finger member assembled with the frame viewed from the top and the bottom, respectively.
Figure 8D:
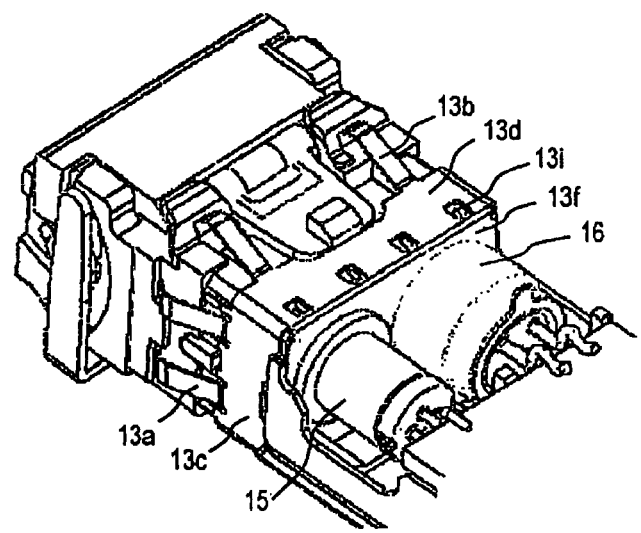

FIG. 8A is a perspective drawing viewed from the front of the finger member 13, while FIG. 8B is a perspective drawing viewed from the rear. The finger member 13, made of stainless sheet with a thickness of about 0.1 mm only by cutting and bending, includes four sides, 13c to 13e, forming a box with a slit 13h in one side 13e. A plurality of fingers 13a protrudes from the side 13c, and other fingers 13b protrude from the bottom 13d. Here, FIG. 8B and FIG. 8D illustrates the finger member 13 in upside-down The bottom 13d is bent inward to form the piece 13f at a side opposite to that protruding the fingers 13b, while, the top 13e is also bent inward to form the piece 13g. The width of the top 13e is narrower than that of the bottom 13d. As described in later, these two pieces, 13f and 13g, are sandwiched between frames 14 and between the frame and the heat dissipating member 18, respectively, to fix the finger member 13 to the frame 14. Moreover, the bottom 13d provides a plurality of projective tabs 13i, and the side 13c forms, in addition to the finger 13a, a plurality of supplemental fingers 13j. These projective tabs 13i and supplemental fingers 13j come in contact to the cover 19, which effectively shields the transceiver 1 by increasing a count of contact.

In order to ensure the firm contact to the cage and to enhance the EMI shield, the finger member 13 should be short as possible in the finger thereof in addition to increase the count of the finger. Accordingly, the present transceiver 1 provides the finger member 13 that has a plurality of fingers, 13a and 13b, independent of the cover 19, and the finger member 13 surrounds the optical receptacle 1a except the region the bail 11 and the actuator 12 are attached thereto. Moreover, since the resin frame 14 is plated with metal, multi-layered nickel (Ni) and gold (Au), in entire surface thereof, the frame 14 may be grounded by the fingers, 13a and 13b, coming in contact to the cage.

The tip of the finger, 13a and 13b, bends inward, which may escape the transceiver 1 from the positional interference. That is, the optical hub system has been developed, in which a plurality of transceivers is arranged in high density, with a span substantially equal to the width and the height of the transceiver. When the transceiver is installed in such densely arranged system, i.e., is inserted into or removed from the densely arranged cage, the fingers may disturb the insertion or the extraction of the transceiver, occasionally, the fingers may be broken by hooking the edge of the cage.

The finger member 13 of the present transceiver 1 provides a plurality of fingers, 13a and 13b. This ensures the firm electrical contact to achieve the stable shield performance because a plurality contact can be realized for any combination of the finger member 13 and the cage, even when the dispersion in the physical dimension exists. The cage is formed by bending a metal sheet, which may be easily deformed by the insertion and the extraction of the transceiver. For such deformed cage, a plural electrical contact between the finger member 13 and the cage can be realized by providing a plurality of fingers. Moreover, the present finger member 13 is made of stainless sheet with a thickness of around 0.1 mm and is bent to show the resilient characteristic similar to a leaf spring. Accordingly, nearly all fingers can come in contact to the deformed cage. The bend of the fingers, 13a and 13b, is 1 mm or more.

The finger member 13 is assembled with the frame 14 to surround the second portion 14b. That is, referring to FIGS. 8C and 8D, the flange, 15b and 16b, of the OSA puts the piece 13f of the finger member 13 between the partition wall, 14n and 14p, as shown in FIG. 8C, while other pieces 13g bent from the top side 13e is inserted into a gap between the heat dissipating member 18 and the frame 14 at the top of the transceiver 1. Although the heat dissipating member is not illustrated in FIG. 8B, the member 18 is set to the frame 14 so as to sandwich the piece 13g between the frame 14. By enlarging the slit 13h, the finger member 13 may be assembled with the frame 14 to surround the second portion 14b thereof. The finger member 13 may recover in its original shape shown in FIGS. 8A and 8B after the setting by the elasticity intrinsically attributed in the material. Moreover, setting the cover 19 to the frame 14, the cover 19 wraps the four sides, 13c to 13e, of the finger member 13, accordingly, the member 13 does not loose. The finger member 13 provides a plurality of projective tabs 13i and a plurality of supplemental fingers 13j to ensure the firm contact between the cover 19.

The tip of respective fingers, 13a and 13b, extending outward is bent inward. i.e., a portion protruding outward, comes in contact to the inside of the cage. When the transceiver is set within the cage, these fingers, 13a and 13b, are extruding from the edge of the cage. Accordingly, a point between this bent portion and the root of the fingers comes in contact to the edge of the opening of the cage not to the inside of the cage, which avoids the positional interference between the opening formed in the sides of the cage or the latch also formed in the sides thereof to come the cage in electrical contact to the face panel of the host system, which secures the firm and stable contact between the cage and the fingers. Tapping to protrude the center of the fingers, 13a and 13b, outwardly may be applicable to accomplish further stable contact to the cage. The tip of the finger, 13a and 13b, the head portion beyond the bent portion, is set within the hollow 14z. As illustrated in FIG. 7B, the bottom of the frame 14 provides two hollows 14z in both side portions thereof, while the sides of the first portion 14a forms another hollow 14z to receiver the tip of the finer 13a. By setting the tip of the fingers, 13a and 13b, it is prevented for the finger to be peeled off and deformed by accidental force.

Assembly of the Bail and the Actuator

The releasing mechanism for the transceiver 1 of the present invention enables to access the bail 11 not only from the top of the transceiver 1 but also from the bottom thereof. That is, by setting the releasing position of the bail 11 to the center of the optical receptacle, while the latching position not only to the top but also to the bottom of the receptacle, it is achieved to operate the bail in ease even when the transceiver 1 is set in the densely arranged cage.

Figure 9A:
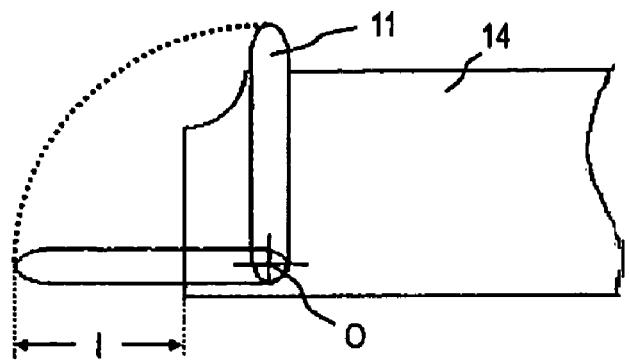
FIG. 9A schematically shows the rotational mechanism of the first conventional combination of the bail and the frame.
Figure 9B:
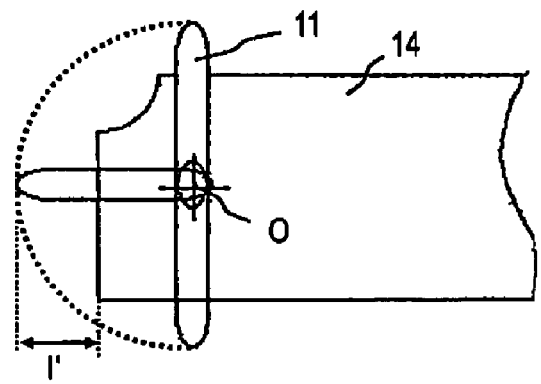
FIG. 9B is a second rotational mechanism of the bail and the frame.

However, in the case that both the top and bottom positions correspond to the latching position with the rotational center of the bail 11 being in the middle of the receptacle as shown in FIG. 9B, which corresponds to the releasing position, the room protruding in the front of the receptacle to grip the bail 11 is compelled to narrow compared to the case that the latching position is set only in the top or the bottom by setting the rotational center of the bail 11 close to the bottom or the center of the receptacle, as shown in FIG. 9A, which causes a troublesome action when the transceiver 1 is released from the cage. Although the lengthened bail 11 expands the room to grip the bail when the rotational axis is set in the middle of the receptacle, this also expands the movable range of the bail 11, which accordingly reduces the installation density. Moreover, the agreement that rules the outer dimension of the transceiver 1 defines that the length protruding from the cover in the vertical direction is smaller than 2 mm.

On the other hand, to set the center of the rotation close to the edge of the receptacle may widen the room to grip the bail 11. However, due to the specification of the optical plug to be inserted in to the optical receptacle, the center of the rotation is necessary to be formed apart from the edge of the receptacle. Thus, the room to grip the bail 11 is ensured only 2.5 mm by the configuration to assume both the top and the bottom to be the latching position shown in FIG. 9A compared to the case that only the top is the latching position shown in FIG. 9B, which ensures the room 1 to grip the bail 11 substantially 6 mm.

Figure 10:
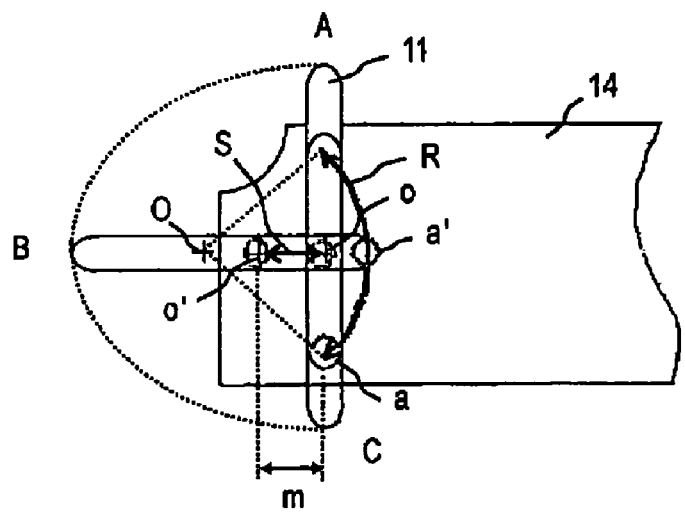
FIG. 10 schematically shows the rotational mechanism of the bail and the frame according to the present invention.

FIG. 10 is a schematic diagram explaining the present mechanism of the bail 11. The bail 11 sets three positions, A, B, and C, corresponding to the top, the center and the bottom of the receptacle, respectively. The bail 11 provides two guide projections, "a" and "o", respectively. The former projection "a" may slide along the groove R, while the latter projection "o" may slide along the groove S. The groove R constitutes, in the present embodiment, a portion of the arc with the center "O" positioning on the virtual line extending the groove S outward.

Specifically, when the bail 11 is in the position A, in the top of the transceiver 1, the guide projection "a" is set in the bottom of the groove R, while the other guide projection "o" is set in the rear end of the groove S. Rotating the bail 11 to the position B, in the front of the receptacle, the guide projection "a" slides within the groove R to the rear end "a'", while the other projection "o" slides within the groove S to the front end "o'". Comparing the case that the bail 11 rotates around the guide projection "o", the bail 11 extrudes from the front of the receptacle by the length the guide projection "o" sliding within the groove S. Further rotating the bail 11 to the bottom position C of the receptacle, the guide projection "a" positions in the top within the groove R, while the other guide projection "o" positions in the rear end within the groove S again. The positions A and B make a symmetrical relation.

In the present mechanism of the bail 11, both the top and the bottom of the receptacle provide the latching position. Besides, the bail 11 protrudes from the front of the receptacle by the length m, which corresponds to the length the second guide projection "o" slides within the groove S and is greater than the case that the bail 11 rotates around the static projection "o". Accordingly, even when the cage is densely arranged in the host system, the bail 11 may be handled in ease.

The description above as referring to FIG. 10 is based on the arched groove R. However, the liner groove R, which makes a T-shaped configuration with the groove S, may show the same function as the description above. When the linear groove R continues to the other linear groove S, the bail 11 would be movable in up and down at the latching positions A and C. When the linear groove R is apart from the linear groove S at the neck position, the rattle motion at the latching positions, A and C, can be prevented but the bail 11 can not stand in vertical to the receptacle. As long as two grooves, R and S, are isolated to each other and the initial position for the first guide projection "a" makes a vertical position against to the initial position for the second guide projection "o", the configuration of the groove R is not restricted to an arched shape.

Figure 11A:
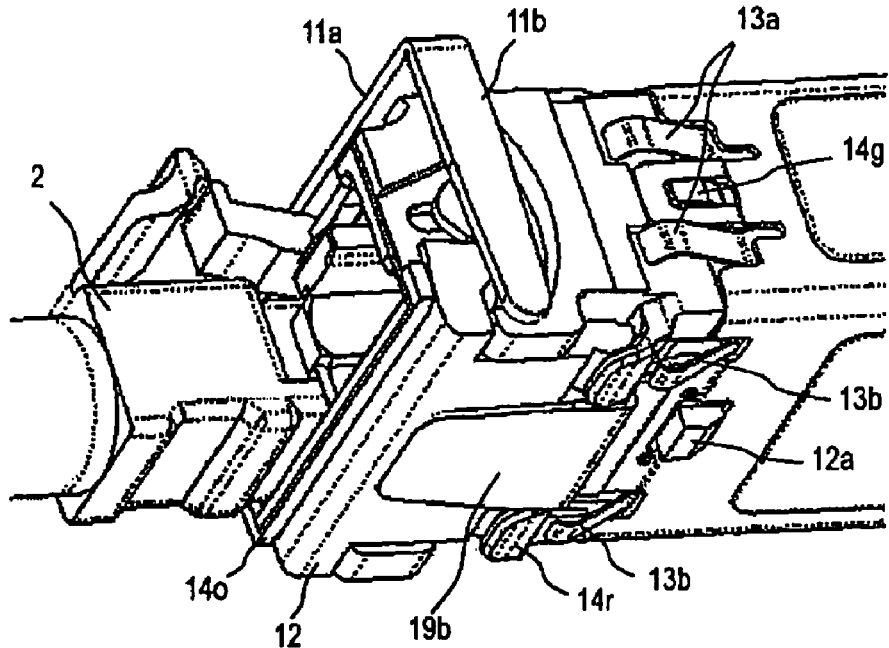
FIG. 11A is a perspective view of the bail and the actuator of the present invention when the bail is in the top of the optical receptacle.
Figure 12A:
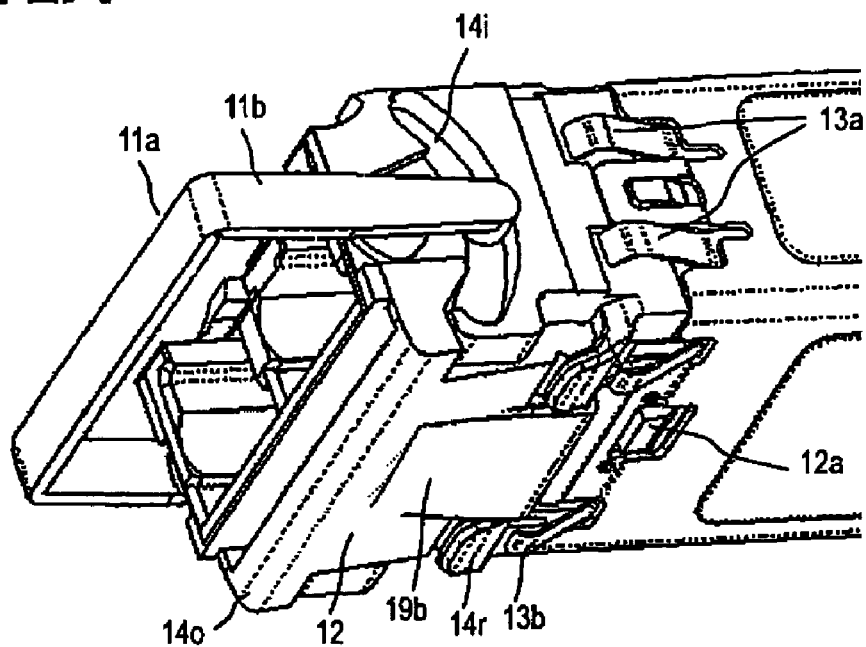
FIG. 12A is a perspective view of the bail and the actuator when the bail is in the front of the optical receptacle.
Figure 12B:
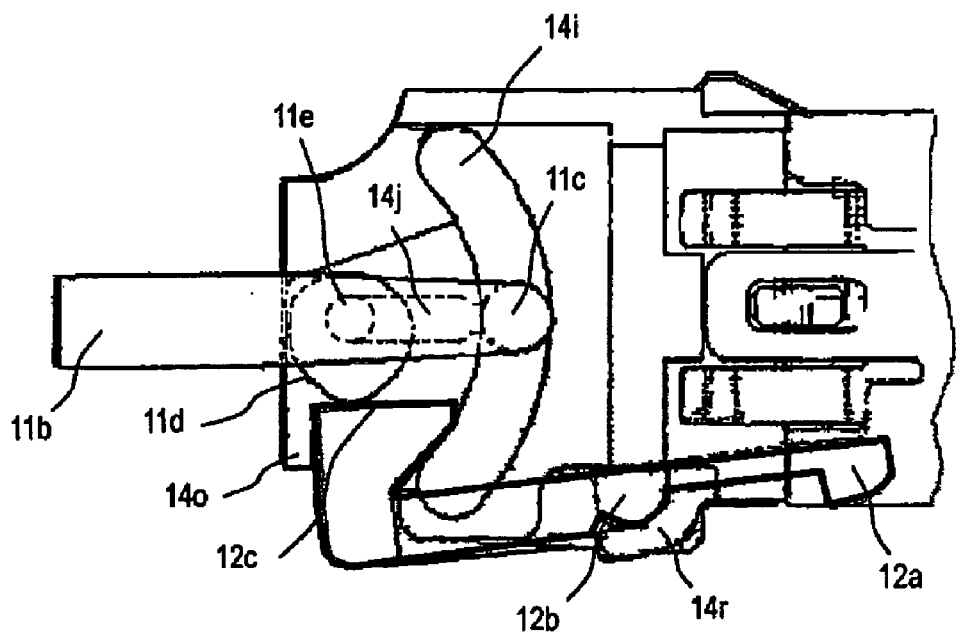
FIG. 12B is a side view showing the same situation of the bail as FIG. 12A.
Figure 13A:
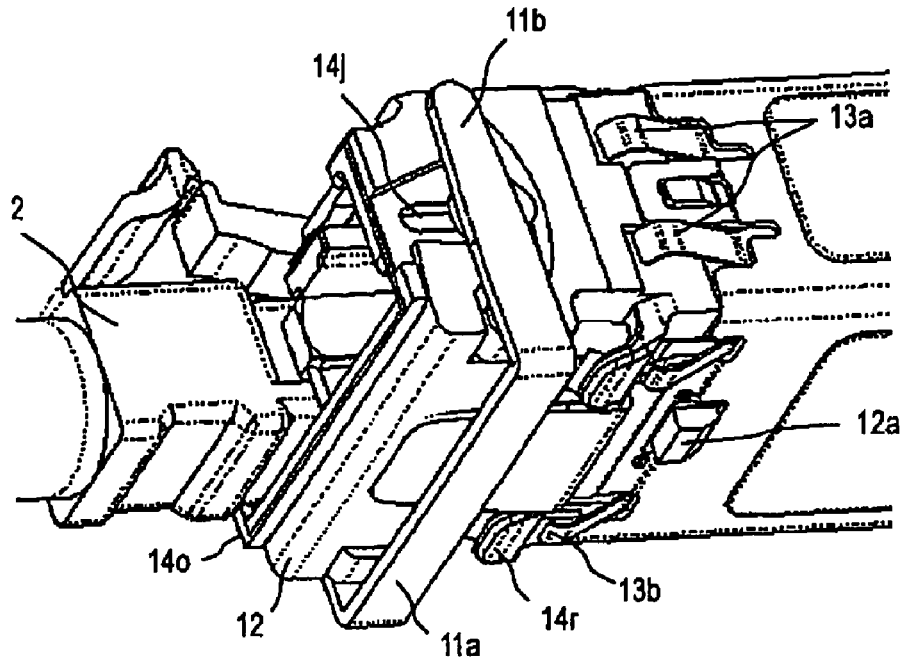
FIG. 13A is a perspective view of the bail and the actuator when the bail is in the bottom of the optical receptacle.
Figure 13B:
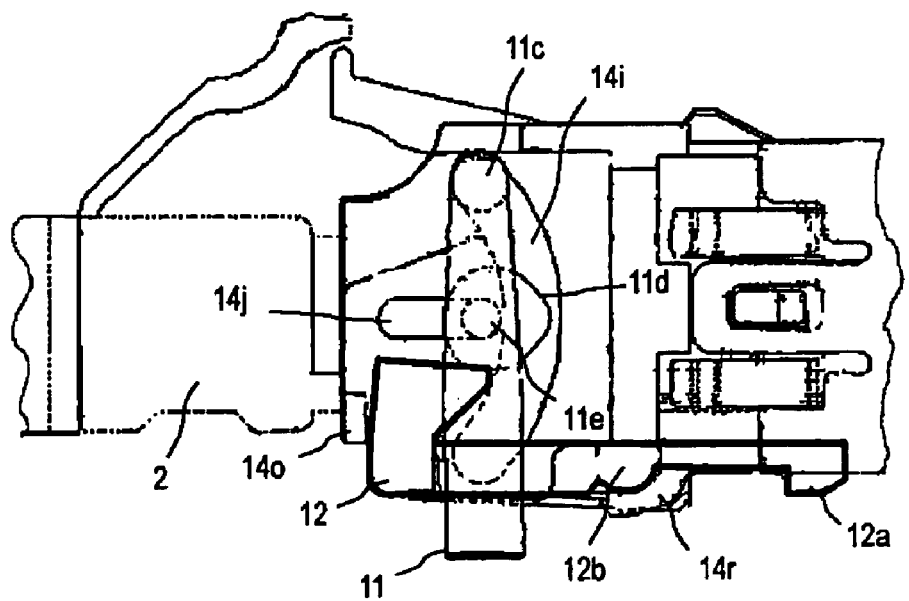
FIG. 13B is a side view showing the same situation of the bail as FIG. 13A.

FIGS. 11 to 13 correspond to the positions, A to C, of the bail 11 in FIG. 10, respectively, and each shows the appearance of the bail 11, the actuator 12, and the front portion of the frame 14. Next, the releasing mechanism of the present transceiver 1 will be explained as referring to drawings from FIG. 11A to FIG. 13B.

Figure 11B:
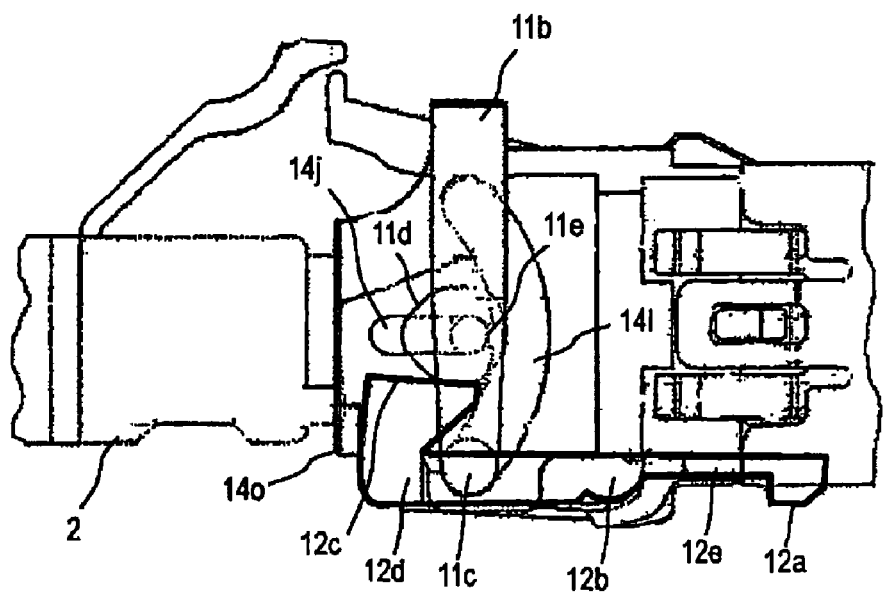
FIG. 11B is a side view showing the same situation of the bail as FIG. 11A.

FIG. 11A is a perspective view showing the bail 11 in the top latching position A, while FIG. 11B is a side view thereof. In these drawings, one of the receptacles 1a receives an optical connector 2. The bail 11 comprises a pair of leg portions 11b and a grip 11a connecting the leg portions 11b, and the bail 11 has a U-shaped configuration. The bail 11 may be made of metal or resin. The present transceiver 1 provides the bail 11 formed by the metal die-casting. On a center of the leg portion 11b is provided with a cam 11d and the first guide projection 11e stacked on the cam 11d with a center thereof identical to each other, while the tip portion of the leg 11b forms the second guide projection 11c so as to face the projection in the other leg 11b. On the outer side wall of the first portion 14a of the frame 14 is formed with the sliding groove 14j, which corresponds to the linear groove S in FIG. 10, to receive the first guide projection 11e and the second sliding groove 14i, corresponding to the arched groove R in FIG. 10, to receive the second guide projection 11c. The bail 11 may rotate in the front of the receptacle as respective guide projections, 11c and 11e, slide within two grooves, 14j and 14i, respectively.

The actuator 12, assembled with the frame 14 by fitting the center 12b thereof into the hooked projection 14r, comprises two arm portions, 12e and 12d, putting the center 12b therebetween. On the tip of the rear arm 12e is formed with a latching projection 12a that engages with the cage, while the front arm 12d provides a sliding surface 12c. The entire actuator 12 is supported from the downward by the support fin 19b of the cover 19 that extends from the front end. When the bail 11 is in the top latching position A, the minor surface of the cam 11d, which is attributed to a minor axis, comes in contact to the sliding surface 12c. In this position, since the front arm 12d is always pushed up by the support fin 19b, the sliding surface 12c is in the highest position, while the latching projection 12a in the other end of the actuator 12 is in the lowest position, protruding outward in the maximum, to engage with the cage.

Rotating the bail 11 to the releasing position B, in the front of the receptacle, FIG. 12A shows a perspective view, while FIG. 12B shows a side view of the relation between the bail 11 and the actuator 12, in this releasing position. The first guide projection 11e slides within the first groove 14j to the front end thereof, while the second guide projection 11c moves to the middle of the second sliding groove 14i. Accordingly, the grip 11a of the bail 11 further protrudes by this sliding length of the first guiding projection 11e, which enables to handle the grip 11a in ease even in the densely arranged cages.

In this position, the cam 11d comes in contact to the sliding surface 12c of the actuator 12 in the major surface, which is attributed to a major axis, to push down the actuator 12 in the maximum. Accordingly, the latching projection 12a formed in the tip of the rear arm 12e is pulled inward to the frame 14 to release the engagement of the projection 12a with the cage.

Further rotating the bail 11 to the bottom latching position C, which is shown in FIG. 13A in a perspective view and FIG. 13B in a plan view, the first guide projection 11e slides to the rear end of the first sliding groove 14j while the second guide projection 11c slides to the topmost within the second guiding groove 14i. Moreover, the minor surface of the cam 11d comes in contact to the sliding surface 12c, accordingly, the latching projection 12a protrudes outward in the maximum to engage with the cage.

During the rotation of the bail 11, the actuator 12 is supported from the downward by the support fin 19b such that the actuator 12 is not disassembled with the frame 14. On the other hand, for the front and back motion of the actuator 12, the hooked projection 14r restricts the backward motion while the projection 14o formed in the front side of the frame 14 restricts the frontward motion of the actuator 12. Accordingly, only the seesaw motion is allowed for the actuator 12 once set in the predetermined position.

Figure 14:
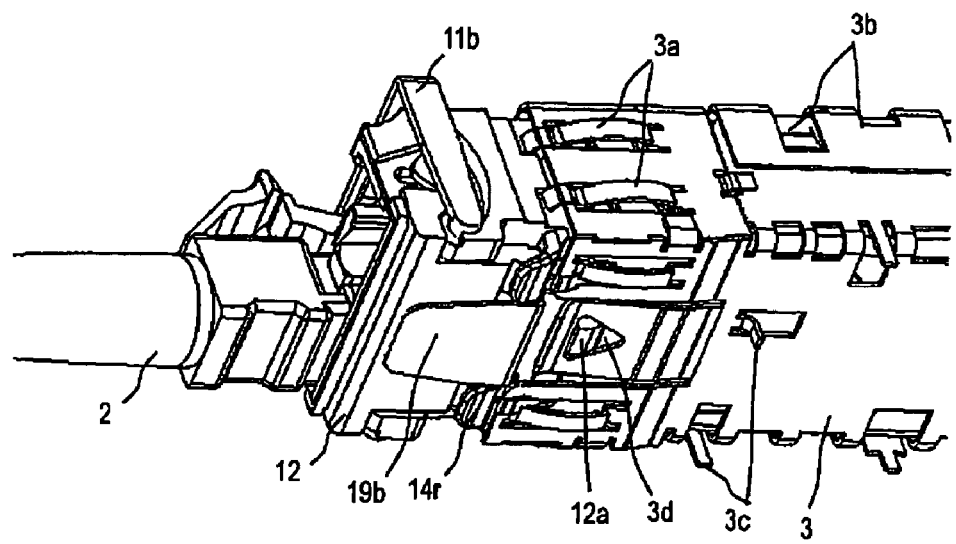
FIG. 14 is a bottom view of the transceiver inserted into the cage.

FIG. 14 views the transceiver 1 inserted within the cage 3 from the bottom. The cage 3, configured to a metal box with one end thereof opened for the outside, receives the transceiver 1 in this open end, and only the bail 11 and the actuator 12 are exposed from the cage 3. The cage 3 provides a plurality of stud pins 3c to fix the cage 3 on the host system. Moreover, in the peripheral of the open end of the cage 3 is formed with a plurality of ground tabs 3a, which comes in contact to the edge of the opening of the face panel, into which the transceiver is inserted. When the transceiver is removed from the cage 3, this ground tabs suppress the EMI noise generated within the host system to leak from the opening or the propagating radiation in the outside to jump into the host system.

On the bottom of the cage 3 is provided with an opening 3d configured in a triangle, with which the latching projection 12a of the actuator engages to latch the transceiver 1 with the cage 3. To rotate the bail 11 to pull up the latching projection 12a may disengage the latching projection 12a with the opening 3d to release the transceiver 1 from the cage 3.

Assembly of the Cover

Figure 1B:
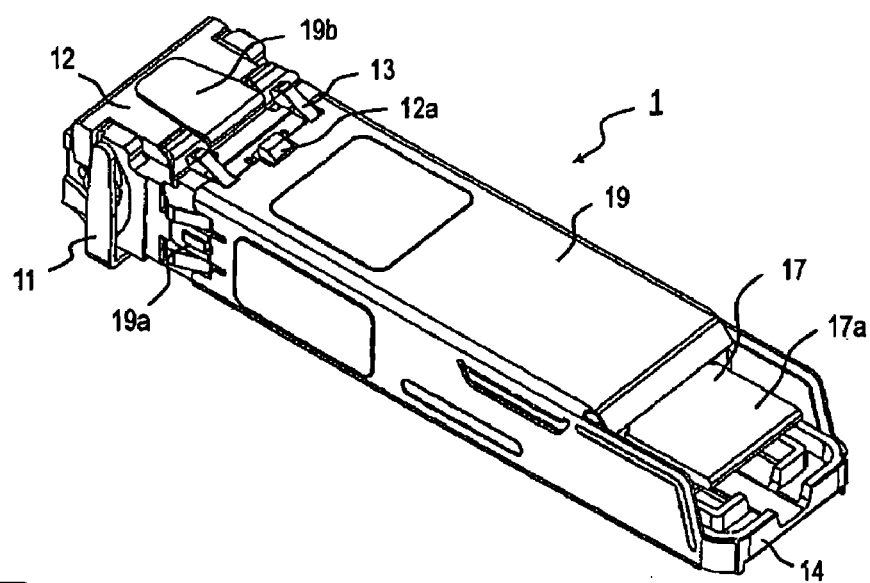
FIG. 1B is a perspective diagram viewed from the bottom of the transceiver.
Figure 15:
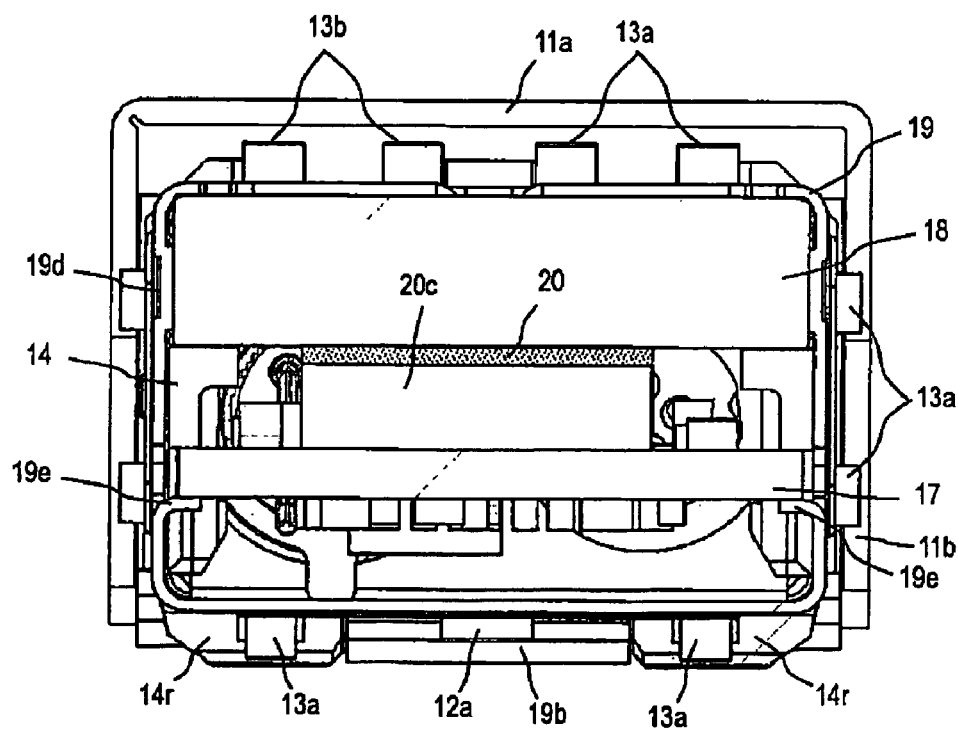
FIG. 15 is a cross section of the completed transceiver taken along the ling A-A in FIG. 1A.

The cover 19, as shown in FIGS. 1A and 1B, covers the heat dissipating member 18 only in the both sides thereof to expose the most of the top surface. The cover 19 is set to the transceiver 1 from the rear thereof so as to put the frame 14, the substrate 17 and the heat dissipating member 18 within the cover. By fitting the opening formed in the latch tab 19a with the projection 14g in both sides of the first portion 14a of the frame 14, the cover 19 may be assembled with the frame 14, the substrate 17, and the heat dissipating member 18. In this process, the latching projection 12a of the actuator 12 protrudes through the opening 19c in the root of the support fin 19b provided in the front tip of the cover 19, which does not disturb the latching mechanism between the latching projection 12a and the opening 3d in the cage 3. In the both sides of the cover 19 are formed with a dent 19d to enhance the thermal coupling between the heat dissipating member 18 and the cover 19. That is, as shown in a cross section of FIG. 15, the distance between the dents 19d is set slightly smaller than the width of the heat dissipating member 18 to make the member 18 in firmly and stably contact to the cover 19 in the transverse direction. FIG. 15 is a cross section taken along the line A-A in FIG. 1A.

Moreover, the cover 19 provides a piece 19e bent inward in both sides thereof, by which the heat dissipating member 18, the frame 14 and the substrate 17 is put between the top surface of the cover 19. By setting the gap from this bent portion to the top of the cover 19 slightly smaller than the total thickness of these three members, 14, 17 and 18, the cover 19 firmly sets these members between the bent portion 19e and the top without any rattling. The thickness of the thermal sheet 20 is so selected that the summed thickness of the thermal sheet 20 and the IC 20c is greater by 30% than the height of the frame 14. That is, the thermal sheet 20 is always compressed by 30% to couple the sheet 20 with the IC 20c in thermally stable. The cover 19, as already explained, may play a role to fix the finger member 13 by putting the member 13 with the frame 14.

Thus described transceiver 1 of the present invention, in particular, the releasing mechanism of the bail 11 combined with the actuator 12 and the cover 19 may solve a subject that, when the cages are densely installed in the optical hub system, the target transceiver in the cage is hard to access because the cages neighbor to the target transceiver and the optical connector and the optical cables accompanied with the transceiver received in the neighbor faces. Because the bail of the present transceiver may widen the room from the front of the receptacle by dynamically protruding therefrom and may be stable in both the bottom and the top of the receptacle, it is able to grip the bail even in the densely arranged cage.

What is claimed is:

1. An optical transceiver utilized in a combination with a cage installed on a host system and optically coupled with an optical fiber accompanying with an optical connector to be mated with the optical transceiver, comprising:
   an optical receptacle for receiving the optical connector;
   a bail including a pair of legs and a grip portion bridging the legs, the bail being attached to the optical receptacle so as to surround the optical receptacle by the grip portion and the legs, the bail capable of rotating such that the grip portion traversing the optical receptacle with a gap; and
   an actuator including an axis and two arms putting the axis therebetween, one of arms coupling with the bail and the other arms providing a projection, the actuator being movable in a seesaw motion by the axis as a center of a rotation,
wherein the gap between the grip portion and the optical receptacle when the grip portion positions in the front of the optical receptacle is greater than the gap when the grip portion positions in the top or the bottom of the optical receptacle.

2. The optical transceiver according to claim 1,
wherein the bail provides a first guide projection between a tip portion of the leg and the grip portion and a second guide projection in the tip portion of the leg, and
wherein the optical receptacle provides a first guide groove configured in a line with a starting point and an ending point to receive the first guide projection and a second guide groove to receive the second guide projection.

3. The optical transceiver according to claim 2,
wherein the second guide groove is configured in an arch with a center located on a virtual line extending the first guide groove.

4. The optical transceiver according to claim 2,
wherein the second guide groove is configured in a line.

5. The optical transceiver according to claim 2,
wherein, when the bail is set in the top or the bottom of the optical receptacle, the first guide projection positions in the start point in the first guide groove, and, when the bail is set in the front of the optical receptacle, the first guide projection positions in the end point in the first guide groove.

6. The optical transceiver according to claim 2,
wherein the leg of the bail further provides a cam with a minor surface and a major surface between the tip portion of the leg and the grip portion, and one of arms of the actuator provides a sliding surface abutting against the cam, and
wherein, when the first guide projection positions in the start point in the first guide groove, the minor surface of the cam touches the sliding surface of the actuator to pull one of the arm of the actuator inward and to push the projection outward, and, when the first guide projection positions in the end point in the first guide groove, the major surface of the cam touches the sliding surface of the actuator to push one of the arm outward and to pull the projection provided in the other arm inward.

7. The optical transceiver according to claim 2,
further includes a metal cover with a support fin to support the one of arms of the actuator.

8. The optical transceiver according to claim 1,
wherein the bail is made of metal die-casting.

9. An optical transceiver utilized in a combination with a cage installed on a host system, comprising:
an optical receptacle for receiving an optical connector; and
a releasing mechanism combined with a bail and an actuator each assembled with the optical receptacle, the bail capable of rotating so as to traverse the optical receptacle,
wherein the optical transceiver engages with the cage when the bail is set in the top or the bottom of the optical receptacle, and the optical transceiver disengages with the cage when the bail is set in the front of the optical receptacle.

10. The optical transceiver according to claim 9, wherein the bail includes a grip portion and a pair of leg portions bridged by the grip portion, a gap between the grip portion and the optical receptacle when the grip is set in the front of the optical receptacle is greater than the gap between the grip portion and the optical receptacle when the grip is set in the top or the bottom of the optical receptacle.

11. The optical transceiver according to claim 10,
wherein the leg portions includes a first guide projection in a center portion of the leg portion and a second guide projection in a tip portion of the leg portion, and the optical receptacle includes a first guide groove configured in a line with a first end and a second end to receive the first guide projection and a second guide groove with a first end, a second end, and a middle point between the first and second ends of the second guide groove, the second guide receiving the second guide projection.

12. The optical transceiver according to claim 11,
wherein, when the bail is set in the top of the optical receptacle, the first guide projection is set in the start end in the first guide groove and the second guide projection positions is set in the first end in the second guide groove, when the bail is set in the front of the optical receptacle, the first guide projection is set in the second end in the first guide groove and the second guide projection is set in the middle point in the second guide groove, and, when the bail is set in the bottom of the optical receptacle, the first guide projection is set in the first end and the second guide projection is set in the second end of the second guide groove.

13. The optical transceiver according to claim 12,
wherein the first end of the, first guide groove and the first and second ends of the second guide groove arranges substantially in a line perpendicular to the first guide groove, and the middle point of the second guide groove locates a side opposite to the first guide groove with respect to the line connecting the first and second ends of the second guide groove and the first end of the first guide groove.

14. The optical transceiver according to claim 13,
wherein, the second guide groove is configured with an arch with a center located on a virtual line extending the first guide groove.

15. The optical transceiver according to claim 13,
wherein the second guide groove is configured with a line, the middle point of the second guide groove being identical with the first end of the first guide groove.

16. The optical transceiver according to claim 13,
wherein the second guide groove is configured with a line, the middle point of the second guide groove being offset from the first end of the first guide groove.

17. The optical transceiver according to claim 10,
wherein the leg portion further provides a cam with a minor surface and a major surface, the cam being formed between the tip portion of the leg portion and the grip portion, and the actuator includes front and rear arms and an axis between the front and rear arms, the front arm mechanically coupling with the cam and the rear arm providing a projection to be engaged with the cage, and
wherein, when the bail is set in the top or the bottom of the actuator, the minor surface of the cam touches the front arm of the actuator to pull the front arm inward and to push the rear arm outward, and, when the bail is set in the front of the optical receptacle, the major surface of the cam touches the front arm to push the front arm outward and to pull the rear arm inward to release the engagement between the projection and the cage.

* * * * *